United States Patent
Tanaka et al.

(10) Patent No.: US 9,359,975 B2
(45) Date of Patent: Jun. 7, 2016

(54) INTERNAL COMBUSTION ENGINE SYSTEM

(71) Applicants: Hideyuki Tanaka, Chiyoda-ku (JP); Yohei Akashi, Chiyoda-ku (JP)

(72) Inventors: Hideyuki Tanaka, Chiyoda-ku (JP); Yohei Akashi, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 250 days.

(21) Appl. No.: 13/746,748

(22) Filed: Jan. 22, 2013

(65) Prior Publication Data

US 2013/0255251 A1 Oct. 3, 2013

(30) Foreign Application Priority Data

Mar. 29, 2012 (JP) .................................. 2012-075477

(51) Int. Cl.
| F02B 33/44 | (2006.01) |
| F02M 25/07 | (2006.01) |
| F02B 39/10 | (2006.01) |
| F02D 41/00 | (2006.01) |
| F02B 33/40 | (2006.01) |

(Continued)

(52) U.S. Cl.
CPC ............... *F02M 25/07* (2013.01); *F02B 33/40* (2013.01); *F02B 39/10* (2013.01); *F02D 41/005* (2013.01); *F02D 41/0007* (2013.01); *F02M 26/07* (2016.02); *F02B 37/04* (2013.01); *F02D 2021/083* (2013.01); *F02D 2041/0017* (2013.01); *Y02T 10/144* (2013.01); *Y02T 10/47* (2013.01)

(58) Field of Classification Search
CPC . F02M 25/07; F02M 25/071; F02M 25/0713; F02M 25/0707; F02B 39/10; F02B 33/40; F02B 37/04; F02D 41/005; F02D 41/0007

USPC ................................................. 60/605.2, 608
See application file for complete search history.

(56) References Cited

U.S. PATENT DOCUMENTS

| 5,577,385 | A | * | 11/1996 | Kapich | ........................... 60/612 |
| 5,771,868 | A | * | 6/1998 | Khair | ........................ 123/568.12 |
| 6,722,129 | B2 | | 4/2004 | Criddle et al. | |

(Continued)

FOREIGN PATENT DOCUMENTS

| JP | 2001-509561 A | 7/2001 |
| JP | 2003-206717 A | 7/2003 |

(Continued)

OTHER PUBLICATIONS

Japanese Office Action dated Feb. 5, 2013, issued in Japanese Patent Application No. JP 2012-075477.

*Primary Examiner* — Audrey K Bradley
*Assistant Examiner* — Jason T Newton
(74) *Attorney, Agent, or Firm* — Sughrue Mion, PLLC; Richard C. Turner

(57) ABSTRACT

Internal combustion engine system includes an electric supercharger which supercharges sucked air; a throttle valve which adjusts the flow amount of intake air of supercharged air into a cylinder; an EGR path in which a part of exhaust gas exhausted from the exhaust manifold side is recirculated to the intake manifold side; an EGR valve which adjusts the amount of exhaust gas passing through the EGR path; and an internal combustion engine control unit which controls the throttle valve, the EGR valve, and the electric supercharger. This enables to satisfy both performance of the supercharger and fuel consumption of the internal combustion engine without complicating the structure of EGR.

9 Claims, 3 Drawing Sheets

(51) Int. Cl.
   *F02D 21/08*       (2006.01)
   *F02B 37/04*       (2006.01)

(56) References Cited

U.S. PATENT DOCUMENTS

| | | | |
|---|---|---|---|
| 6,938,420 B2* | 9/2005 | Kawamura et al. | 60/612 |
| 7,530,229 B2* | 5/2009 | Akita | 60/608 |
| 2003/0024499 A1* | 2/2003 | Umezono | F02B 31/085 |
| | | | 123/301 |
| 2003/0140909 A1 | 7/2003 | Criddle et al. | |
| 2006/0156724 A1* | 7/2006 | Dismon et al. | 60/605.2 |
| 2006/0162333 A1* | 7/2006 | Isogai | 60/601 |
| 2006/0196182 A1* | 9/2006 | Kimoto et al. | 60/605.1 |
| 2006/0207252 A1 | 9/2006 | Isobe et al. | |
| 2008/0053091 A1* | 3/2008 | Barthelet | 60/608 |
| 2008/0148730 A1* | 6/2008 | Akita | F02B 37/22 |
| | | | 60/608 |
| 2012/0285165 A1* | 11/2012 | Han et al. | 60/605.2 |
| 2013/0255251 A1* | 10/2013 | Tanaka | F02M 25/07 |
| | | | 60/605.2 |

FOREIGN PATENT DOCUMENTS

| | | |
|---|---|---|
| JP | 2006-029273 A | 2/2006 |
| JP | 2006-242065 A | 9/2006 |
| JP | 2009-162208 A | 7/2009 |
| JP | 2012-021489 A | 2/2012 |

* cited by examiner

INTERNAL COMBUSTION ENGINE SYSTEM

BACKGROUND OF THE INVENTION

The present invention relates to an internal combustion engine system equipped with a supercharger and EGR in an intake air path.

There has been known a technology in which a supercharger driven by a motor is provided in an intake air path in order to increase the output of an internal combustion engine for the purpose of low fuel consumption of an automobile. There has been also known the mechanism of exhaust gas recirculation (hereinafter, referred to as "EGR"), which achieves a reduction in pumping loss or a reduction in nitrogen oxides (hereinafter, referred to as "NOx") by recirculating a part of exhaust gas to the intake air side. As for a gasoline internal combustion engine, the EGR is placed; and accordingly, it becomes possible to open a throttle valve when the internal combustion engine is operated at low load and it becomes possible to improve fuel consumption of the internal combustion engine by reducing the pumping loss. As for the rest, like a lean burn engine, when the engine is operated with low fuel quantities, air becomes excess and thus combustion temperature rises to generate NOx. However, recirculation of exhaust gas is performed by the EGR; and accordingly, the combustion temperature can be lowered and the generation of NOx can be suppressed. Also, as for a diesel internal combustion engine, operation is performed by air mixed with exhaust gas to lower combustion temperature; and accordingly, a reduction in the generation of NOx can be achieved.

Incidentally, gas flowing in an EGR path flows from the higher side to the lower side in pressure distribution; and therefore, the pressure on the intake air side needs to be low in order to recirculate exhaust gas from the exhaust side to the intake air side. For this reason, for example, in a vehicle equipped with a turbocharger, a flow path on the exhaust side is taken out from the forward side of a turbine and a pressure drop of exhaust due to the presence of the turbine is utilized to recirculate exhaust gas to the intake air side. As for the rest, if a gasoline vehicle, there has been known a system that recirculates exhaust gas to the intake air side by utilizing that an intake manifold on the backward side of a throttle is negative pressure.

Under such a background, a supercharging system of an internal combustion engine disclosed in Japanese patent application No. 2001-509561A (U.S. Pat. No. 5,771,868) shows a configuration in which intake air of the EGR is recirculated to the upstream side of an electric supercharger and intake air (air sucked from the atmosphere) is mixed with exhaust gas to input to the electric supercharger. The exhaust gas is mixed with the intake air at a constant rate by this configuration; and accordingly, a reduction in NOx generated in the internal combustion engine is achieved.

Furthermore, a crankcase ventilation system disclosed in Japanese patent application No. 2003-206717A (U.S. Pat. No. 6,772,129 B2) shows an internal combustion engine equipped with a two step supercharging air amplification system. According to this configuration, recirculation gas by EGR is introduced to the upstream or the downstream of the electric supercharger depending on a driving state of a turbocharger and an electric supercharger. This enables exhaust gas to be recirculated on the basis of the pressure of each intake pipe; and therefore, the exhaust gas of the internal combustion engine can be purified.

Further, an EGR system of a vehicular internal combustion engine with a supercharger disclosed in Japanese patent application No. 2006-029273A includes an electric supercharger and a bypass valve that bypasses the electric supercharger; and an EGR path is placed between the electric supercharger and the bypass valve. According to this configuration, an operating range of introducing EGR is set to control the flow amount of exhaust gas recirculated from the EGR path depending on an operating state of the internal combustion engine. This improves responsiveness of the internal combustion engine during acceleration and accordingly exhaust emission can be improved.

The internal combustion engine needs to be mounted in a limited space in an automobile; and therefore, the internal combustion engine with good fuel consumption is required to be reduced in weight and in size as much as possible. Furthermore, an intake air flow path is preferable to be simple as much as possible in order to efficiently operate the internal combustion engine, because it becomes problematic that a complicated intake air flow path not only lowers the output of the internal combustion engine due to an intake air pressure drop but also increases in size due to an increase in the whole volume. However, in Japanese patent application No. 2001-509561A (U.S. Pat. No. 5,771,868) and Japanese patent application No. 2003-206717A (U.S. Pat. No. 6,772,129 B2), a problem exists in that the EGR path needs to be placed as far as near an inlet port of intake air and thus the length of an EGR path becomes long; and a problem exists in that it takes time until exhaust gas moves because the EGR path becomes long and thus controllability is deteriorated.

Furthermore, in Japanese patent application No. 2006-029273A), a problem exists in that, although the length of the EGR path is short, the bypass valve of the electric supercharger is needed and thus the configuration of the intake air path becomes complicated.

SUMMARY OF THE INVENTION

The present invention has been made to solve the problem described above, and an object of the present invention is to provide an internal combustion engine system that can satisfy both performance of a supercharger and fuel consumption of an internal combustion engine without complicating the structure of EGR in the internal combustion engine system equipped with the supercharger and the EGR.

In order to solve the above problem, an internal combustion engine system as set forth in claim 1 of the present invention includes: an internal combustion engine; an electric supercharger which is placed in an intake air path of the internal combustion engine and supercharges air to be sucked into the internal combustion engine; a throttle valve which is placed in the intake air path of the internal combustion engine and controls the flow amount of intake air into the internal combustion engine depending on operation conditions of an accelerator pedal; an EGR path which is connected to the downstream side of the electric supercharger and recirculates a part of exhaust gas of the internal combustion engine to the intake air side; an EGR valve which is placed in the EGR path and adjusts the flow amount of the exhaust gas; and an internal combustion engine control unit which controls the electric supercharger, the throttle valve, and the EGR valve.

Furthermore, in order to solve the above problem, an internal combustion engine system as set forth in claim 5 of the present invention includes: an internal combustion engine; an electric supercharger which is placed in an intake air path of the internal combustion engine and supercharges air to be sucked into the internal combustion engine; a turbocharger which is placed in the intake air path of the internal combustion engine and is placed on the downstream side of the electric supercharger to supercharge air to be sucked into the internal combustion engine; a throttle valve which is placed in an intake air path of the internal combustion engine and controls the flow amount of intake air into the internal combustion engine depending on operation conditions of an accelerator pedal; an EGR path which is connected to the upstream side of the turbocharger and to the downstream side of the electric supercharger and recirculates apart of exhaust gas of the internal combustion engine to the intake air side; an EGR valve which is placed in the EGR path and adjusts the flow amount of the exhaust gas; and an internal combustion engine control unit which controls the electric supercharger, the turbocharger, the throttle valve, and the EGR valve.

According to an internal combustion engine system equipped with a supercharger and an EGR of the present invention, the length of an EGR path can be shortened, a reduction in size of the EGR can be achieved, and a reduction in size can be achieved, thereby enabling a supercharger and the flow amount of EGR to be controlled with good controllability, whereby an effect exists in that fuel consumption of an internal combustion engine can be improved.

The foregoing and other object, features, aspects, and advantages of the present invention will become more apparent from the following detailed description of the present invention when taken in conjunction with the accompanying drawings.

DETAILED DESCRIPTION OF THE INVENTION

Hereinafter, internal combustion engine systems according to embodiments of the present invention will be described with reference to FIG. 1 to FIG. 3.

Embodiment 1

Figure 1:
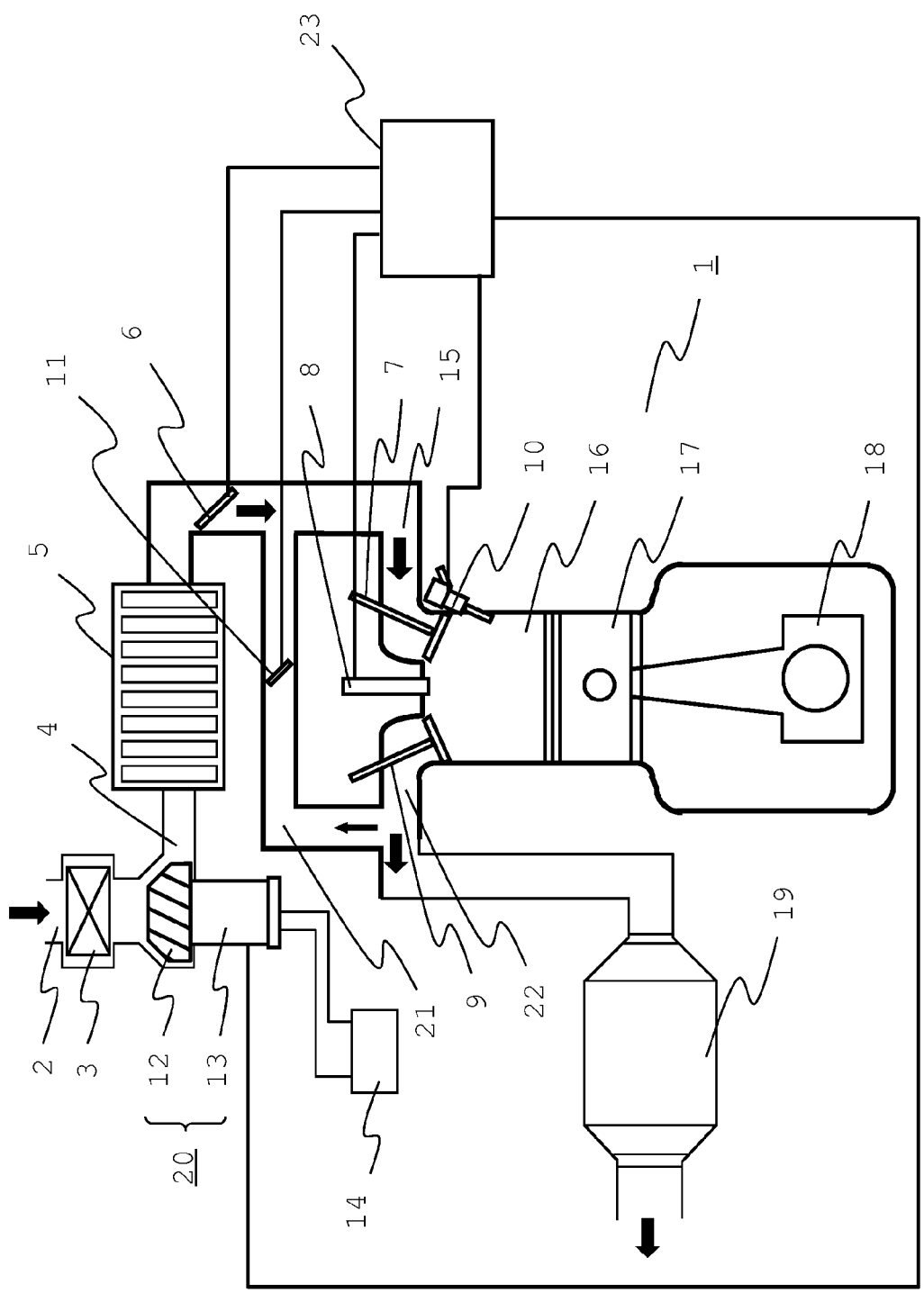
FIG. 1 is an entire configuration view showing an internal combustion engine system according to Embodiment 1.
Figure 2:
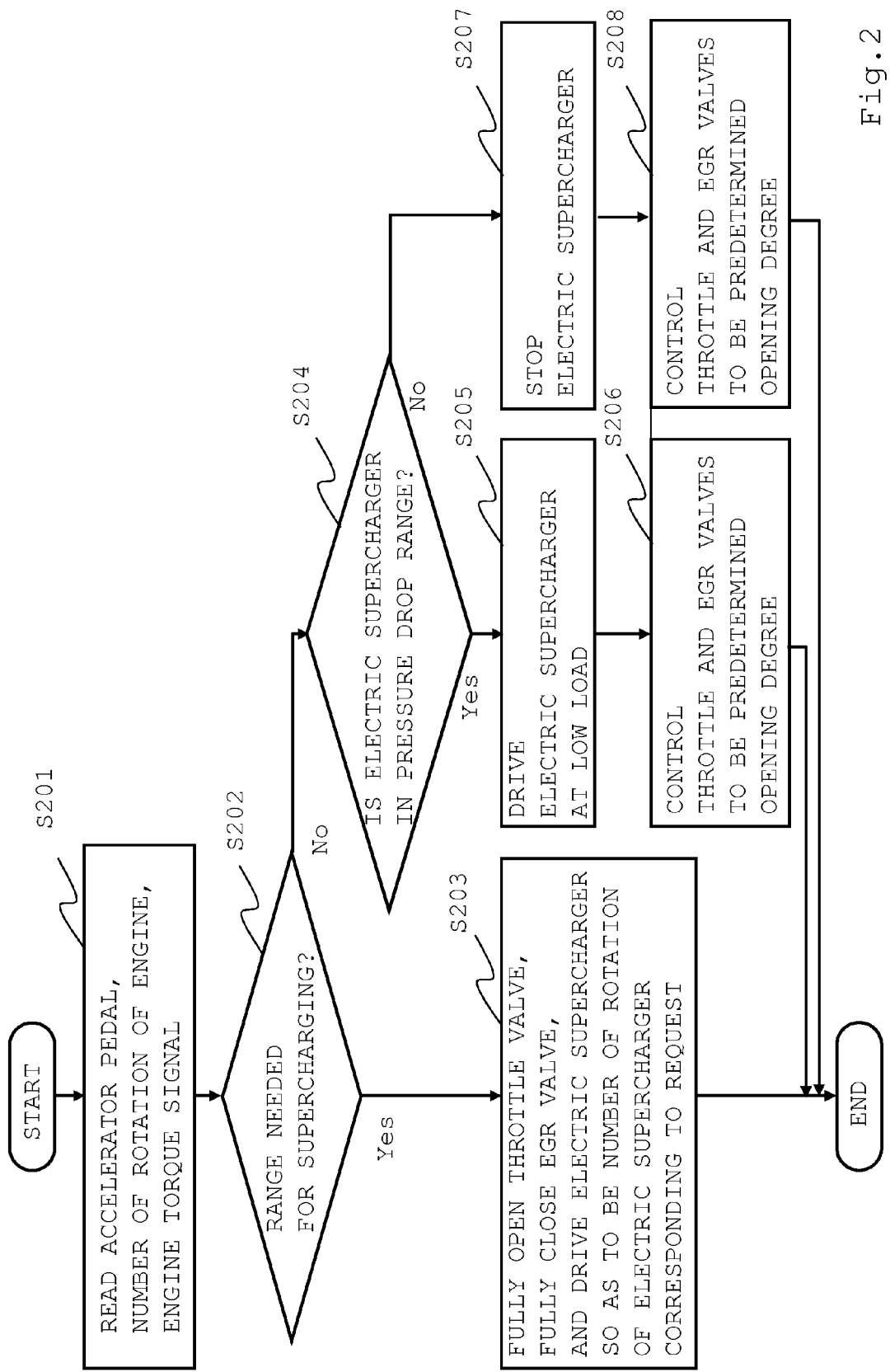
FIG. 2 is a flowchart showing supercharging process procedures of the internal combustion engine system according to Embodiment 1.

FIG. 1 is an entire configuration view showing an internal combustion engine system according to Embodiment 1 and FIG. 2 is a flowchart showing supercharging process procedures of the internal combustion engine system according to Embodiment 1.

First, the entire configuration of the internal combustion engine system according to Embodiment 1 will be described using FIG. 1. An internal combustion engine (hereinafter, referred to as "engine") 1 includes: a cylindrical cylinder 16; a piston 17 reciprocatable in the direction of the cylinder 16; a crank 18 which reciprocates the piston 17 in the cylinder 16 to convert to rotational motion; an injector (fuel injection valve) 10 which is provided at the top of the head of the engine 1 and directly injects fuel into the cylinder 16; and an ignition plug 8 which sparks to ignite air-fuel mixture formed in the cylinder 16. Furthermore, the engine 1 is provided with: an intake manifold 15; an exhaust manifold 22 which exhausts exhaust gas in which the air-fuel mixture is burned and generated in the cylinder 16; an intake valve 7 which opens or closes between the cylinder 16 and the intake manifold 15; and an exhaust valve 9 which opens or closes between the cylinder 16 and the exhaust manifold 22.

Further, the internal combustion engine system includes: an intake port 2 which sucks air from outside air into the cylinder 16; an air cleaner 3 which removes foreign particles, dusts, and the like from the sucked air; an electric supercharger 20 which is composed of a compressor impeller 12 and a charging device 14 that supplies power source to a motor 13 for driving the compressor impeller 12 and supercharges the sucked air; an intercooler 5 that cools air which passes through a downstream side path 4 of the electric supercharger 20 and is heated by the electric supercharger 20; a throttle valve 6 which is provided on the upstream side of the intake manifold 15 and adjusts the flow amount of intake air of the cooled air to be supplied to the cylinder 16; anEGRpath 21 which recirculates a part of exhaust gas exhausted from the exhaust manifold 22 side to the intake manifold 15 side; an EGR valve 11 which adjusts the amount of exhaust gas passing through the EGR path 21; an exhaust purification catalyst 19 which purifies the exhaust gas; and an internal combustion engine control unit (hereinafter, referred to as "engine ECU") 23 which controls the throttle valve 6, the EGR valve 11, and the electric supercharger 20.

Incidentally, although the engine 1 described in this embodiment is a multicylinder engine, only one cylinder thereof is shown in FIG. 1. The engine 1 is an engine which is of a type that injects fuel into the cylinder 16 by the injector 10. A great deal of intake air is supercharged by the compressor impeller 12 of the electric supercharger 20 to achieve not only high output but also low fuel consumption, the compressor impeller 12 being driven by the motor 13 of the electric supercharger 20.

Next, the operation of the internal combustion engine system according to Embodiment 1 of the present invention will be described. First, foreign particles, dusts, and the like of sucked air are removed by the air cleaner 3 from the intake port 2 and then the sucked air passes through an upstream path of the electric supercharger 20. Air compressed by the compressor impeller 12 of the electric supercharger 20 passes through the intercooler 5 from the downstream path 4. The intercooler 5 lowers temperature of intake air, which is raised in temperature with an increase of pressure rise due to supercharging, to improve filling efficiency. Further, the supercharged air passes through the throttle valve 6 to be introduced into the cylinder 16.

Subsequently, the intake valve 7 is opened and the intake air is filled into the cylinder 16; fuel is injected from the injector 10 to form air-fuel mixture; and the air-fuel mixture is ignited by the ignition plug 8 to be burned. The burned air-fuel mixture is exhausted passing through the exhaust manifold by the exhaust valve 9. A part of the exhaust gas passes through the EGR path 21 and is adjusted in the amount of recirculation by the EGR valve 11 to be recirculated to the intake manifold 15 on the backward side of the throttle valve 6. The remaining exhaust gas is sent to the exhaust purification catalyst 19 to be purified.

The engine ECU 23 operates the electric supercharger 20, the EGR valve 11, and the throttle valve 6 by the number of revolutions of the engine, an accelerator position, an intake pressure, the amount of intake air, and the like. The electric supercharger 20 is driven by the motor 13 in response to a command value from the internal combustion engine control unit 23. In this case, the accelerator position is reflected by the accelerator operation of a driver. As for the intake pressure, for example, this pressure can be obtained by providing a pressure sensor or the like in the intake manifold 15. As for the amount of intake air, for example, this amount can be detected by providing an air flow sensor or the like on the backward side of the air cleaner 3.

Furthermore, the EGR valve 11 is driven in response to a command value from the engine ECU 23. A pumping loss of the engine 1 is reduced by controlling in conjunction with the throttle valve 6 and accordingly fuel consumption can be improved.

More specifically, the command value may be calculated by providing a target number of revolutions of the electric supercharger corresponding to the accelerator position and the number of revolutions of the engine, a target opening degree of the EGR valve, a target opening degree of the throttle valve, and the like as a map. Furthermore, each control target value can be held as a function. For example, in the case of holding as a function, an advantage exists in that the amount of memory in software can be small as compared to the map.

Next, the operation of the internal combustion engine system according to Embodiment 1 will be described on the basis of the supercharging process procedures shown in the flow chart of FIG. 2.

First, in step S201, an operation state of an accelerator pedal performed by a driver, the number of revolutions of the engine, and an engine torque signal are read to be stored. In the next step S202, a determination is made whether or not it is a range needed for supercharging from an operating state of the engine and a signal of an accelerator pedal required by the driver.

When it is determined that supercharging is needed in step S202, the throttle valve 6 is fully opened and the EGR valve 11 is fully closed and the electric supercharger 20 is driven so as to generate the output of the engine 1 corresponding to the request of the driver in the next step S203. At this time, supply electricity to the electric supercharger 20 may be supplied from the charging device 14 or may be supplied from a generator equipped in the internal combustion engine system. Furthermore, as for the amount of intake air needed for the engine 1, the amount of intake air is not adjusted by using a bypass valve or the like in a supercharging range, but the amount of intake air is adjusted by input electricity to the electric supercharger 20 and by fully opening the throttle valve 6; and accordingly, it becomes possible not only to simplify control of the throttle valve 6 but also to simplify a device needed for supercharging without necessity of providing an excess intake air route such as the bypass valve.

When it is determined that supercharging is not needed in step S202, it is determined whether or not the electric supercharger 20 is in a region that becomes a pressure drop in the next step S204. Intake air that passed through the electric supercharger may be in a range that becomes a pressure drop in a region where supercharging is not performed. In this case, when the electric supercharger is in a pressure drop range, the intake air becomes negative pressure; and therefore, a pumping loss increases and fuel consumption rather deteriorates as the internal combustion engine. The engine ECU 23 is provided with a pressure drop map of the electric supercharger for each engine 1.

When it is determined that the electric supercharger 20 is in the pressure drop range in step S204, the electric supercharger 20 is driven at low electricity (low load) so as not to be a pressure drop in the next step S205. At this time, the amount of drive of the electric supercharger may be set depending on the amount of intake air into the engine 1 and can be achieved by being preliminarily provided in the engine ECU 23 as the map. Incidentally, drive electricity of the electric supercharger 20 rotates the electric supercharger 20 to the extent that prevents a pressure drop; and therefore, the electric supercharger 20 is driven by small electricity and thus fuel consumption is sufficiently improved as compared to a deterioration in fuel consumption due to a pumping loss caused by the pressure drop.

In the next step S206, the throttle valve 6 and the EGR valve 11 are controlled to be a predetermined opening degree based on the command value of the engine ECU 23. As described above, the electric supercharger 20 is driven to prevent the pressure drop and the opening degree of the throttle valve 6 and the EGR valve 11 is adjusted; and accordingly, the pressure drop is prevented. Therefore, the pumping loss of the internal combustion engine is reduced and the operation of the internal combustion engine with good fuel consumption can be achieved without placing a flow path that bypasses the electric supercharger 20.

When the processes of step S203, step S206, or step S208 are completed, the supercharging process procedures are terminated and the processing is returned to step S201; and the processing is performed depending on a change in the operation state of the accelerator pedal by the driver or periodically performed.

Incidentally, the description has been mainly made in Embodiment 1 on the operation in which the driver operates the accelerator pedal and supercharging is needed; however, it is also conceivable a case where the internal combustion engine is shifted from a supercharging range to a non-supercharging range by operating the accelerator pedal by the driver. In such a case, generally, in the case of a turbocharger in which the supercharger is driven by exhaust gas, a temporal delay is generated in a change in exhaust energy and thus pressure on the intake air side is likely to be excess. In this regard, in the case of the electric supercharger, the internal combustion engine can be shifted from the supercharging range to the non-supercharging range by lowering the number of revolutions with good responsiveness depending on the accelerator pedal operation; and therefore, the flow amount of intake air needed for the internal combustion engine can be achieved with good responsiveness. Therefore, the control of the flow amount of EGR is easier than the case of the turbocharger and an available operating range can be enlarged by the EGR; and thus, fuel consumption of the internal combustion engine can be improved.

As described above, according to the internal combustion engine system of Embodiment 1, piping (path) of the intake air system is not complicated and the electric supercharger and the EGR path are placed; and accordingly, the whole system can be reduced in size. Furthermore, the electric supercharger, the EGR valve, and the throttle valve are controlled by the engine ECU and accordingly not only the operation of the internal combustion engine, which is excellent in responsiveness corresponding to accelerator pedal operation of a driver, can be performed but also the amount of recirculation of exhaust gas can be appropriately controlled; and therefore, there can be expected a remarkable effect in which fuel consumption can be improved.

Embodiment 2

Figure 3:
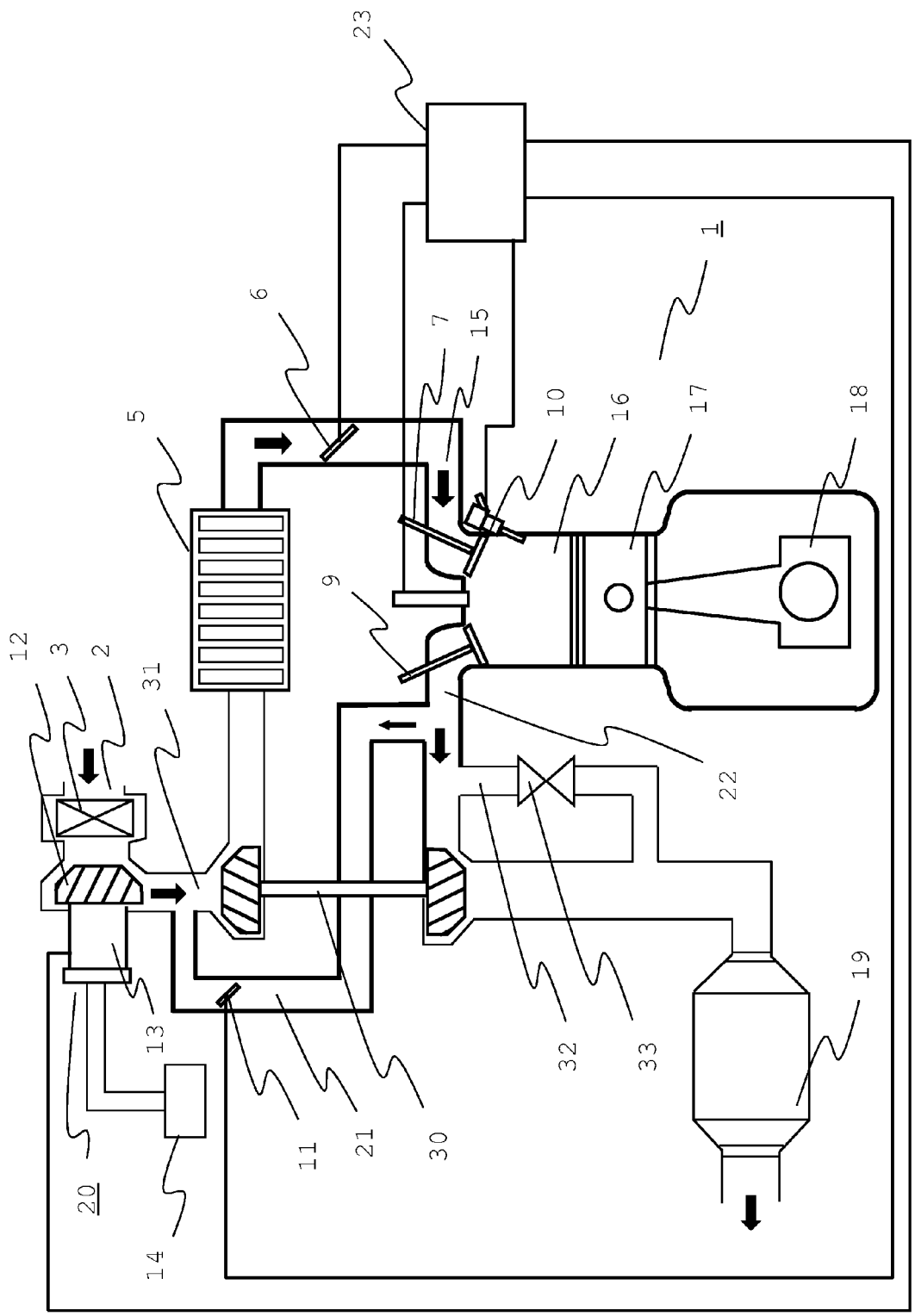
FIG. 3 is an entire configuration view showing an internal combustion engine system according to Embodiment 2.

FIG. 3 is an entire configuration view showing an internal combustion engine system according to Embodiment 2.

As shown in FIG. 3, the internal combustion engine system of Embodiment 2 is similar to FIG. 1 of Embodiment 1 except for points that a turbocharger 30 driven by exhaust gas is placed, and an EGR path in which a part of exhaust gas is recirculated to the intake air side is connected between the downstream side of an electric supercharger and the upstream side of a turbocharger; and therefore, other constitutional elements will not be described.

In a vehicle equipped with a turbocharger 30 like Embodiment 2, the EGR path 21 in which a part of the exhaust gas is recirculated from the exhaust side is not communicated to the intake manifold 15, but the EGR path 21 is communicated to a path 31 located in the downstream of the electric supercharger 20 and in the upstream of the turbocharger 30 and apart of the exhaust gas is recirculated to the path 31.

Next, the operation of the internal combustion engine system according to Embodiment 2 of the present invention will be described. The pressure in the EGR path on the exhaust gas side is higher than atmospheric pressure because of the presence of a turbine of the turbocharger 30; and therefore, it becomes possible to recirculate a great deal of exhaust gas to the intake air side. Incidentally, at this time, when exhaust gas is recirculated by the EGR in process of supercharging by the electric supercharger 20, the pressure in the path 31 on the upstream side of the turbocharger 30 is higher than the pressure in the EGR path on the exhaust side; and therefore, when supercharging is performed by the electric supercharger 20, the EGR valve is closed. Further, in the case of shifting from a range needed for supercharging of the electric supercharger 20 to a range not needed for supercharging by a command from the engine ECU 23 by accelerator pedal operation of a driver, the number of revolutions of the electric supercharger 20 is lowered to the number of revolutions not needed for supercharging by the electric supercharger 20 and the EGR valve 11 is opened; and accordingly, it becomes possible to rapidly shift to an operating range that can recirculate by EGR and thus operation with good fuel consumption can be achieved.

Furthermore, the EGR path 21 is not connected to the upstream side of the electric supercharger 20, but the EGR path 21 is connected to the path 31 on the upstream side of the turbocharger 30; and accordingly, the entire piping length can be shortened and thus a reduction in size can also be achieved.

Incidentally, when the supercharging operation is performed by only the turbocharger 30, the EGR valve 11 can be controlled depending on an operating state. For example, when combustion temperature in the engine is desired to be lowered in a high supercharging operating range, exhaust gas is mixed with air by opening the EGR valve 11 and therefore the combustion temperature lowers. At this time, the exhaust gas flowing into the turbine of the turbocharger 30 is made to bypass by a bypass 32 provided between the exhaust valve and the exhaust purification catalyst and a turbine bypass valve 33 of the bypass 32 is also simultaneously controlled; and accordingly, exhaust side pressure can be reduced.

Furthermore, as regarding that the electric supercharger is in a region that becomes a pressure drop, the electric supercharger may be driven even when supercharging is not needed as in Embodiment 1. This is similar to Embodiment 1 and therefore a detailed description thereof will be omitted here.

As described above, according to the internal combustion engine system of Embodiment 2, the whole system can be reduced in size without complicating intake air system piping (path) by placing the electric supercharger, the turbocharger, and the EGR path, as in Embodiment 1. Furthermore, the turbocharger is also provided and the electric supercharger, the turbocharger, the EGR valve, and the throttle valve are controlled by the engine ECU; and accordingly, there can be expected remarkable effects in which not only further excellent driving of the internal combustion engine can be performed for responsiveness corresponding to accelerator pedal operation of a driver but also the amount of recirculation of the exhaust gas can be appropriately controlled and thus fuel consumption can be improved.

Incidentally, in the above embodiment, the motor 13 of the electric supercharger 20 can use a DC brushless motor, an induction motor, a synchronous motor, and the like depending on the conditions of capacity, necessary torque, and the like. In order to drive the motor 13 of the electric supercharger 20, supply electricity obtained from the charging device 14 through wiring is converted to be supplied to the motor 13 through an inverter incorporated in the motor 13. The inverter includes a semiconductor module in which semiconductor elements are mounted in a casing of the motor 13, electronic components such as capacitors, and a control substrate provided with a generation circuit and a protection circuit of control signals for driving the semiconductor elements. The inverter converts direct current electricity of the charging device 14 into alternating current electricity needed for the motor 13. Material of the casing may be resin; however, a material with high heat conductivity, such as aluminum is preferable in order to enhance heat dissipation properties.

Furthermore, the charging device 14 may be of an existing 12 V system, so-called, a lead battery; however, in the case where large electricity is needed, the charging device 14 may be of a device that requires a voltage of several ten V to several hundred V, such as a nickel hydrogen battery, a lithium ion battery, and the like. It is characterized in that the higher the voltage of a storage battery that supplies electricity is, the better the efficiency of the motor is; however, this does not have direct influence on the above embodiment; and therefore, all charging devices capable of supplying electricity to the electric supercharger can be applied to the storage battery.

Furthermore, an engine to which the present invention is applied can be applied not only to a direct injection engine which injects fuel into the cylinder, but also to a port injection engine which injects fuel to the intake air path 15 on the backward side of the throttle valve. Besides, the engine to which the present invention is applied can be applied not only to a gasoline engine, but also to a diesel engine.

Further, in the present invention, the respective embodiments can be freely combined and appropriately changed or omitted within the scope of the present invention.

In addition, the same reference numerals as those in the drawings represent the same or corresponding elements.

What is claimed is:
1. An internal combustion engine system comprising:
an internal combustion engine;
an electric supercharger which is placed in an intake air path of the internal combustion engine and is configured to supercharge air to be sucked into the internal combustion engine;
a throttle valve which is placed in the intake air path of the internal combustion engine and is configured to control a flow amount of intake air into the internal combustion engine based on an amount of operation of an accelerator pedal;
an EGR path which is connected to a downstream side of the electric supercharger and is configured to recirculate apart of exhaust gas of the internal combustion engine to an intake air side of the internal combustion engine;
an EGR valve which is placed in the EGR path and is configured to adjust a flow amount of the exhaust gas; and
an internal combustion engine control unit which is configured to control the electric supercharger, the throttle valve, and the EGR valve, wherein the internal combustion engine control unit includes a pressure drop map of the electric supercharger which maps the flow amount of intake air of the internal combustion engine relative to a corresponding operating state of the electric supercharger, and wherein the internal combustion engine control unit is configured to adjust a driving state of the electric supercharger according to the flow amount of intake air of the internal combustion engine when the intake air in an area of the intake air path corresponding to the electric supercharger experiences a pressure drop, and to adjust the EGR valve to have a predetermined opening degree.

2. The internal combustion engine system according to claim 1, wherein the internal combustion engine control unit is configure to calculate an output of the internal combustion engine based on an amount of operation of the accelerator pedal and to control the electric supercharger and the EGR valve.

3. The internal combustion engine system according to claim 1,
wherein, when it is determined that supercharging by the electric supercharger is needed for the internal combustion engine based on the amount of operation of the accelerator pedal, the internal combustion engine control unit is configured to control the electric supercharger to output a supercharged pressure corresponding to the amount of operation of the accelerator pedal, and wherein the throttle valve is fully opened and the EGR valve is fully closed when it is determined that supercharging is needed.

4. The internal combustion engine system according to claim 1,
wherein the internal combustion engine control unit is configured to control the electric supercharger, the throttle valve, and the EGR valve without using a bypass path configured to bypass the electric supercharger.

5. An internal combustion engine system comprising:
an internal combustion engine;
an electric supercharger which is placed in an intake air path of the internal combustion engine and is configured to supercharge air to be sucked into the internal combustion engine;
a turbocharger which is connected at both a downstream side of the electric supercharger and an exhaust path of the internal combustion engine, the turbocharger being configured to supercharge air to be sucked into the internal combustion engine;
a throttle valve which is placed in the intake air path of the internal combustion engine and which is configured to control a flow amount of intake air into the internal combustion engine based on an amount of operation of an accelerator pedal;
an EGR path which is connected to an upstream side of the turbocharger and to the downstream side of the electric supercharger, and which is configured to recirculate a part of exhaust gas of the internal combustion engine to an intake air side of the internal combustion engine;
an EGR valve which is placed in the EGR path and is configured to adjust a flow amount of the exhaust gas; and
an internal combustion engine control unit which is configured to control the electric supercharger, the turbocharger, the throttle valve, and the EGR valve,
wherein the internal combustion engine control unit includes a pressure drop map of the electric supercharger which maps the flow amount of intake air of the internal combustion engine relative to a corresponding operating state of the electric supercharger, and wherein the internal combustion engine control unit is configured to adjust a driving state of the electric supercharger according to the flow amount of intake air of the internal combustion engine when the intake air in an area of the intake air path corresponding to the electric supercharger experiences a pressure drop, and adjusts the EGR valve to have a predetermined opening degree.

6. The internal combustion engine system according to claim 5,
wherein the turbocharger includes a turbine bypass valve which is configured to cause at least a portion of the exhaust gas to bypass an exhaust-side turbine of the turbocharger; and
the internal combustion engine control unit is configured to calculate an output of the internal combustion engine based on an amount of operation of the accelerator pedal and controls the electric supercharger, the turbine bypass valve, and the EGR valve.

7. The internal combustion engine system according to claim 5,
wherein the internal combustion engine control unit is configured to adjust the EGR valve to be a predetermined opening degree when it is determined that supercharging by the turbocharger is needed for the internal combustion engine based on the amount of operation of the accelerator pedal.

8. The internal combustion engine system according to claim 5, wherein, when it is determined that supercharging by the electric supercharger is needed for the internal combustion engine based on the amount of operation of the accelerator pedal, the internal combustion engine control unit is configured to control the electric supercharger to output a supercharged pressure corresponding to the amount of operation of the accelerator pedal, and wherein the throttle valve is fully opened and the EGR valve is fully closed when it is determined that supercharging is needed.

9. An engine system comprising:
an internal combustion engine;
an electric supercharger located at an intake air path of the internal combustion engine which is configured to supercharge air to be input to the internal combustion engine;
a throttle valve located at the intake air path of the internal combustion engine which is configured to control an intake air flow;
an EGR valve which is configured to adjust an exhaust gas flow from the internal combustion engine; and
an internal combustion engine control unit which is configured to control the electric supercharger, the throttle valve, and the EGR valve using a pressure drop map of the electric supercharger which maps the intake air flow relative to a corresponding operating state of the electric supercharger, and to adjust a driving state of the electric supercharger according to the flow amount of intake air when the intake air in an area of the intake air path corresponding to the electric supercharger experiences a pressure drop, and to adjust the EGR valve to have a predetermined opening degree.

* * * * *